(12) United States Patent
Chen et al.

(10) Patent No.: US 12,043,568 B2
(45) Date of Patent: Jul. 23, 2024

(54) PROCESS FOR MAKING ANTI-REFLECTIVE OPTICAL GLASS AND PRODUCT THEREOF

(71) Applicants: Kuan-Wei Chen, Tainan (TW); Jason Shian-Ching Jang, Tainan (TW)

(72) Inventors: Kuan-Wei Chen, Tainan (TW); Jason Shian-Ching Jang, Tainan (TW)

(73) Assignee: TACHI METAL MATERIAL TECHNOLOGY CO., LTD., Tainan (TW)

( * ) Notice: Subject to any disclaimer, the term of this patent is extended or adjusted under 35 U.S.C. 154(b) by 829 days.

(21) Appl. No.: 17/170,787

(22) Filed: Feb. 8, 2021

(65) Prior Publication Data

US 2022/0250974 A1    Aug. 11, 2022

(30) Foreign Application Priority Data

Feb. 27, 2020   (TW) .................. 109106490

(51) Int. Cl.
*C03C 19/00*    (2006.01)
*B24B 37/10*    (2012.01)
*B24B 37/14*    (2012.01)

(52) U.S. Cl.
CPC ............ *C03C 19/00* (2013.01); *B24B 37/105* (2013.01); *B24B 37/14* (2013.01)

(58) Field of Classification Search
CPC .............................. C03C 19/00; B23B 37/105
See application file for complete search history.

(56) References Cited

U.S. PATENT DOCUMENTS

| | | | | |
|---|---|---|---|---|
| 5,095,664 A | * | 3/1992 | Zayhowski | C03C 19/00 451/41 |
| 6,194,068 B1 | * | 2/2001 | Ohashi | B23D 61/185 428/364 |
| 6,332,829 B1 | * | 12/2001 | Trommer | B24B 1/005 451/28 |
| 2003/0170417 A1 | * | 9/2003 | Saito | G11B 5/73921 |
| 2003/0217989 A1 | * | 11/2003 | Benning | C03C 15/02 216/41 |
| 2016/0163344 A1 | * | 6/2016 | Kashima | G11B 5/84 428/827 |

* cited by examiner

*Primary Examiner* — Cynthia Szewczyk

(57) ABSTRACT

A process for making anti-reflective optical glass comprises the steps of:
A. implementing an abrading tool including a carrier having a plurality of diamond cutting wires formed on the carrier; and
B. centrifugally and resiliently abrading a substrate of optical glass by the abrading tool to form a plurality of microscopic protuberances or moth-eye like structures on the substrate to thereby reduce the light reflection from the substrate and increase the light transmission in the substrate.

10 Claims, 4 Drawing Sheets

PROCESS FOR MAKING ANTI-REFLECTIVE OPTICAL GLASS AND PRODUCT THEREOF

BACKGROUND OF THE INVENTION

In order to reduce the light reflection on an optical glass of a conventional display or monitor screen, a photolithography is provided to form a moth-eye structure on the surface of optical glass to thereby obtain an anti-reflective surface on the optical glass.

However, the conventional photolithography for making the moth-eye structure has the following drawbacks:
1. The production cost is very high, while its yield rate is low, thereby lacking of economic value.
2. An etching liquid is used in the photolithography process. Such an etching liquid is corrosive and may cause pollution to affect the environmental protection.
3. It may be used for creating shapes that are flat. It is not suitable for making moth-eye structure on a curved surface. So, it may be limited only for a small scale production, and is not suitable for mass production of optical glass.

The present inventor has found the drawbacks of the conventional process, and invented the present process for making anti-reflective optical glass for enhancing mass production and increasing economic value.

SUMMARY OF THE INVENTION

The object of the present invention is to provide a process for making anti-reflective optical glass comprising the steps of:
A. implementing an abrading tool including a carrier having a plurality of diamond cutting wires formed on the carrier; and
B. centrifugally and resiliently abrading a substrate of optical glass by the abrading tool to form a plurality of microscopic protuberances or moth-eye like structures on the substrate to thereby reduce the light reflection from the substrate and increase the light transmission in the substrate.

Another object of the present invention is to provide a product as made by the process as above mentioned.

The present invention may be further described in the following description accompanying with the drawings.

DETAILED DESCRIPTION

As shown in FIGS. 1-6, the present invention provides an abrading tool for abrading or carving a substrate 3 of an optical glass, optical film or optical product to form a moth-eye like structure on the substrate.

Figure 1:
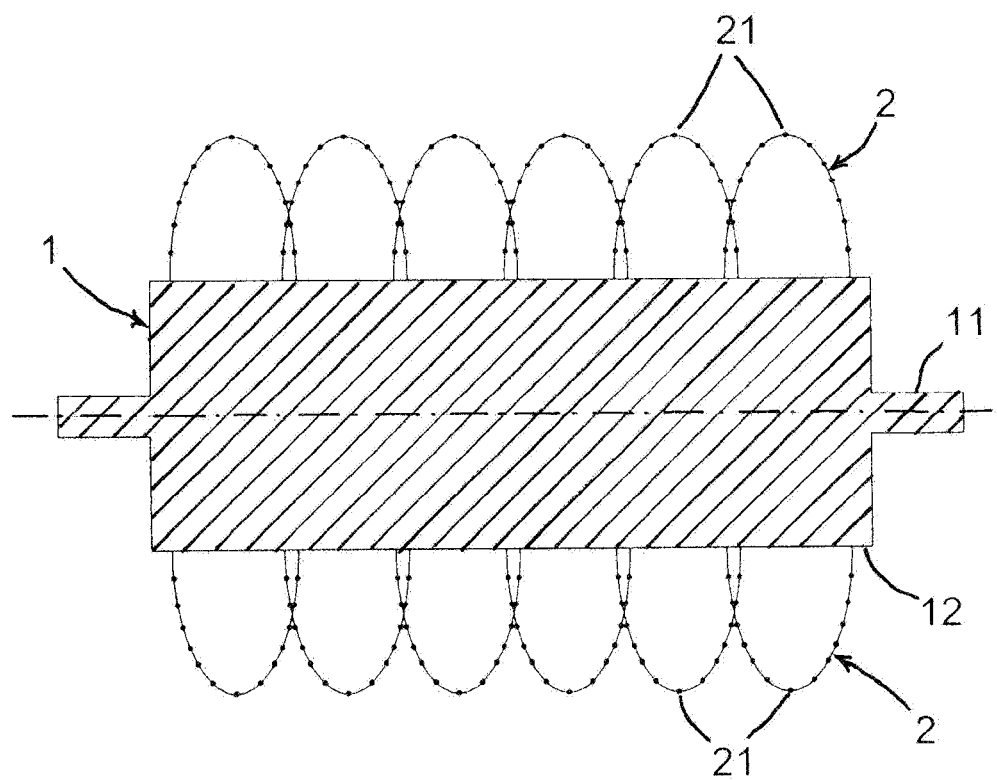
FIG. 1 is a sectional drawing of the abrading tool of the present invention.
Figure 2:
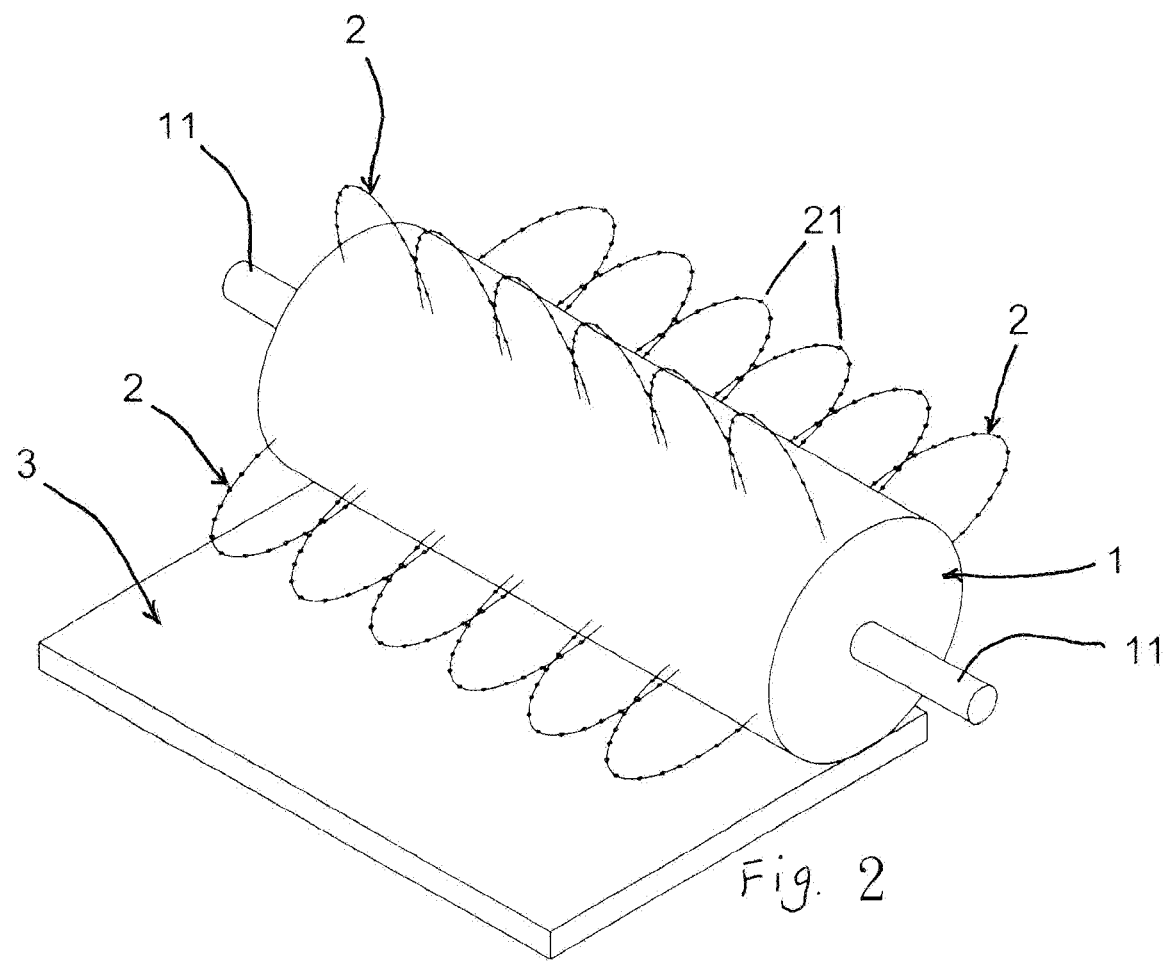
FIG. 2 is an illustration showing the abrading operation in accordance with the present invention.
Figure 7:
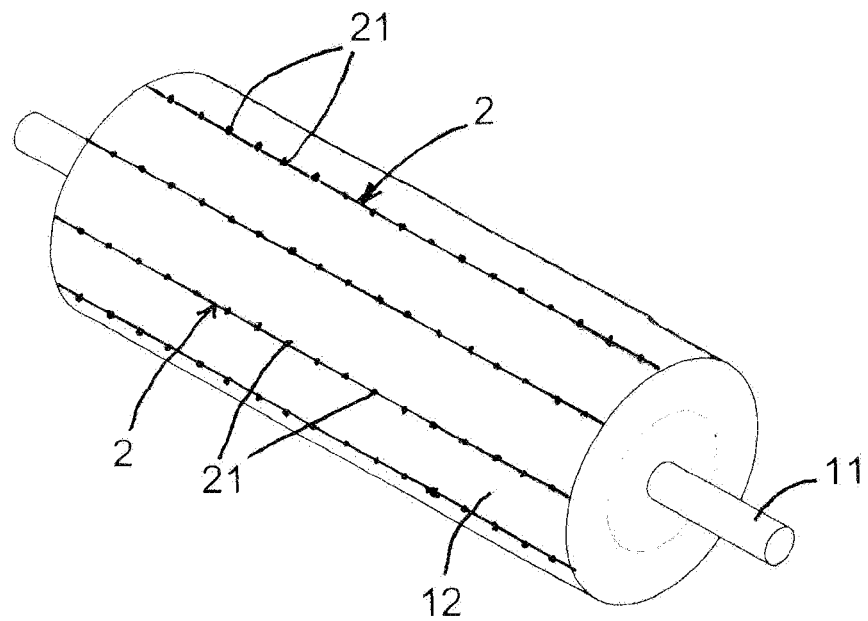
FIG. 7 shows another preferred embodiment of the present invention.

The abrading tool includes: a carrier 1 which may be a rotary carrier, and at least a diamond cutting wire 2 formed on the carrier 1. The diamond cutting wire 2 may be formed as a loop shape as shown in FIGS. 1 and 2; or formed as linear shape as shown in FIG. 7, not limited in this invention. Plural cutting wires 2 are preferred in this invention.

The carrier 1 may be a rotary carrier having an axle 11 axially formed in the carrier to be rotatably driven by a motor (not shown) to allow the diamond cutting wires 2 formed on the carrier 1 for abrading or carving the moth-eye like structure on the substrate 3.

Each diamond cutting wire 2 includes a plurality of diamond grains or beads 21 formed, plated, bonded, or connected on the diamond cutting wire 2.

Figure 3:
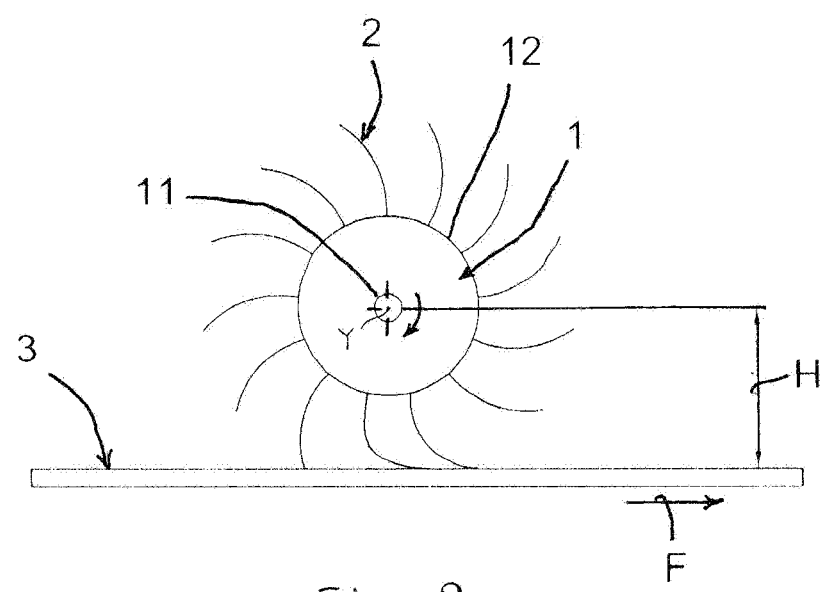
FIG. 3 is a sectional drawing showing the abrading operation of the present invention.

As shown in FIG. 3, a height or distance H between an axis Y of the axle 11 of the carrier 1 and the substrate 3 may be adjusted during the operation to be commensurate with the abraded or carved depth on the substrate. Upon rotation of the carrier 1 and forwarding the substrate 3 in a forward direction F as driven by a conveyor (not shown), the grains 21 on the cutting wire 2 will centrifugally resiliently abrade or carve a plurality of nanometric grooves on the substrate 3 to thereby form microscopic protuberances or moth-eye like structure on the substrate.

The acute or prism angles of the diamond grains 21 on the cutting wire 2 may efficiently abrade or carve the substrate due to the hardness of the diamond grains 21. Simultaneously, the centrifugal force and spring force from the cutting wire 2 when rotatably thrusted during the high-speed rotation of the carrier 1 may also help the abrading or carving of the grains 21 on the substrate surface. So, by merely using a light (not heavy) force of the rotating carrier 1 and the cutting wires 2, a plurality of microscopic grooves will be carved on the substrate to thereby form a moth-eye like structure on the substrate 3.

The substrate 3 includes screen of cell or smart phone, screen of touch display, monitor, lens, and substrates of any other optical products.

The optical glass includes: glasses; and transparent plastics (or plastic glasses) including polycarbonate (PC), and polyethylene terephthalate (PET), etc.

As shown in FIG. 7, the diamond cutting wires 2 are formed on a surface portion 12 of the carrier 1. Such a surface portion 12 is made of elastomer materials to serve as a resilient cushion for the diamond cutting wires 2.

In the present invention, there are plural operation parameters which may be optionally adjusted in order to be commensurate with the process and product requirements. By adjusting the rotating speed of the carrier 1 and the distance between carrier 1 and substrate 3, H, the centrifugal force and spring force of the diamond cutting wires 2 may be adjusted to thereby produce the corresponding depth of the carved grooves as cut by the wires 2. The density of the carved grooves may also be adjusted for matching the dimensions of the moth-eye like structures. The cutting wires 2 are centrifugally resiliently "thrusted" on the substrate surface, and can closely approximate the substrate surface to perform a homogeneous carving operation, especially suitable for carving a curved substrate surface.

The parameters may be optionally adjusted with respect to the product dimensions, properties, different wave lengths of light, and light transmission through the optical glass.

The substrate 3, after being carved to form moth-eye structure, will render anti-reflective surface on the substrate to reduce the incoming light reflection, and to increase the light transmission through the substrate, thereby providing anti-glare effect and increasing efficiency of optical glass.

Figure 4:
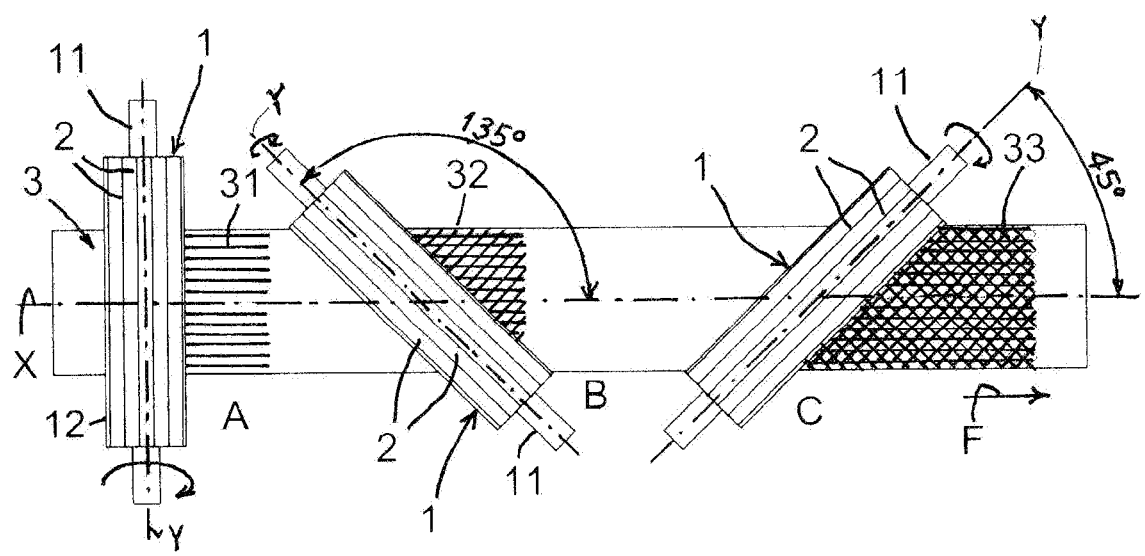
FIG. 4 shows the abrading operation in multiple directions for abrading or carving the plural protuberances for forming moth-cye structures on the substrate of the optical glass.
Figure 5:
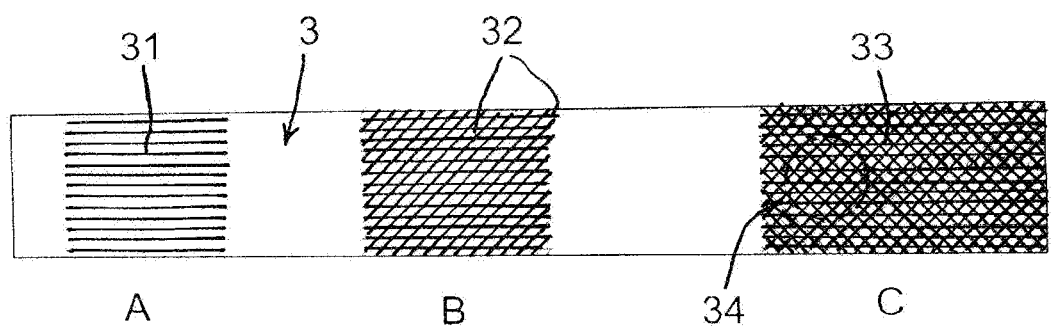
FIG. 5 is a top-view illustration of the carved substrate as processed from FIG. 4.
Figure 6:
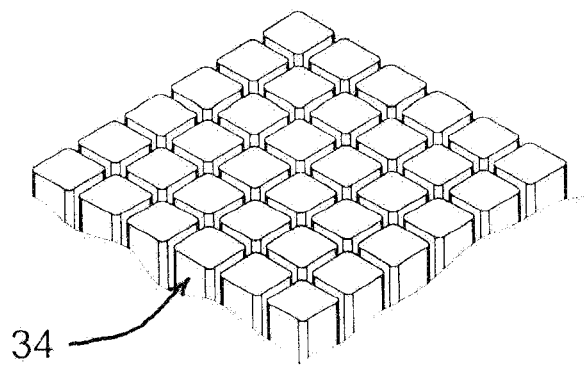
FIG. 6 is a partial enlarged view as circled on FIG. 5.

As shown in FIGS. 4-6, the substrate 3 is conveyed forwardly in a forward direction F, and three carriers 1, particularly rotary carriers are respectively installed on three locations A, B, C of the substrate 3 as described hereinafter;

Location A:

The rotary carrier 1 has its axis Y of axle 11 perpendicular to the longitudinal axis X of the substrate.

Upon rotation of the carrier 1 and forward driving of the substrate 3, the diamond cutting wires 2 will carve plural longitudinal grooves 31 parallel to the longitudinal axis X of the substrate.

Location B:

The rotary carrier 1 is now projectively deviated from the longitudinal axis X with an obtuse angle 135 degrees between the axle axis Y and the longitudinal axis X of the substrate.

Upon rotation of the carrier 1 and forward driving of the substrate 3, the diamond cutting wires 2 will carve plural leftward oblique grooves 32, which will intersect the longitudinal grooves 31 as previously cut in Location A to form a primary polygonal protuberances at Location B.

Location C:

The rotary carrier 1 is now projectectively deviated from the longitudinal axis X with an acute angle 45 degrees between the axle axis Y and the longitudinal axis X.

Upon rotation of the carrier 1 and the forward driving of the substrate 3, the diamond cutting wires 2 will carve plural rightward oblique grooves 33, which will intersect the longitudinal grooves 31, and the leftward oblique grooves 32 to form a secondary polygonal protuberances at Location C, especially as shown in FIG. 6.

Naturally, the deviating angles of the axle 11 of the carrier 1 with the longitudinal axis X of the substrate are not limited, and can be optionally adjusted according to practical requirements.

The present invention has the following advantages:
1. The production equipments are simple, with low cost, so that the process of this invention is suitable for mass production, being rich in commercial value.
2. The diamond grains 21 are firmly fixed on the cutting wires 2 so as to help stabilize the abrading or carving operation, increasing the product quality and product yield rate.
3. By applying the centrifugal force and spring force of the thrusting diamond cutting wires 2 upon the substrate surface, the polygonal protuberances or moth-eye like structure on the substrate will be carved more homogeneously, especially suitable for carving a curve surface of the substrate.
4. No etching liquid is required in this process, being beneficial for environmental protection.
5. This process is applicable for producing a large-scale optical glass, better for mass production and for increasing production capacity.
6. The operation parameters may be optionally adjusted for controlling the light transmission rate corresponding to different lights of different wave lengths, to thereby meet the different optical properties of different optical glasses or products.

The present invention may be further modified without departing from the spirit and scope of the present invention.

We claim:

1. A process for making anti-reflective optical glass comprising the steps of:

A. implementing an abrading tool including a carrier having a plurality of diamond cutting wires formed on the carrier; and
B. centrifugally and resiliently abrading a substrate of optical glass by the abrading tool to form a plurality of microscopic protuberances or moth-eye like structures on the substrate to thereby reduce the light reflection from the substrate and increase the light transmission in the substrate.

2. A process according of claim 1, wherein said abrading tool includes: a rotary carrier, and at least a diamond cutting wire formed on the rotary carrier.

3. A process according of claim 2, wherein said diamond cutting wire is formed as a loop shape or formed as linear shape.

4. A process according of claim 1, wherein said carrier is a rotary carrier having an axle axially formed in the carrier to be rotatably driven by a motor to allow the diamond cutting wires formed on the carrier for abrading or carving the moth-eye structure on the substrate.

5. A process according of claim 4, wherein a height or distance between an axis of the axle of the carrier and the substrate is adjustable during the operation to be commensurate with the abraded or carved depth on the substrate, whereby upon rotation of the carrier and forwarding the substrate in a forward direction as driven by a conveyor, the grains on the cutting wire will centrifugally resiliently abrade or carve a plurality of nanometric grooves on the substrate to thereby form microscopic protuberances or moth-eye like structure on the substrate.

6. A process according of claim 4, wherein said substrate is conveyed forwardly in a forward direction, and three carriers, including three rotary carriers are respectively installed on three following locations of the substrate:
   wherein when first location is met, said rotary carrier has its axis of axle perpendicular to a longitudinal axis of the substrate, whereby upon rotation of the carrier and forward driving of the substrate, the diamond cutting wires will carve plural longitudinal grooves parallel to the longitudinal axis of the substrate;
   wherein when a second location is met, said rotary carrier is now projectively deviated from the longitudinal axis with an obtuse angle between the axis of axle and the longitudinal axis of the substrate, whereby upon rotation of the carrier and forward driving of the substrate, the diamond cutting wires will carve plural leftward oblique grooves, which will intersect the longitudinal grooves as previously cut in first location to form a primary polygonal protuberances at the second location;
   and wherein when a third location is met, said rotary carrier is now projectively deviated from the longitudinal axis with an acute angle between the axis of axle and the longitudinal axis, whereby upon rotation of the carrier and the forward driving of the substrate, the diamond cutting wires will carve plural rightward oblique grooves, which will intersect the longitudinal grooves, and the leftward oblique grooves to form a secondary polygonal protuberances at the third location.

7. A process according of claim 1, wherein said diamond cutting wire includes a plurality of diamond grains formed, plated, bonded, or connected on the diamond cutting wire.

8. A process according of claim 1, wherein said substrate includes screen of phone, screen of display, monitor, lens, and substrates of optical products.

9. A process according of claim 1, wherein the optical glass includes: glasses; and transparent plastic glasses.

10. A process according of claim 1, wherein said diamond cutting wires are formed on a surface portion of the carrier; and said surface portion is made of elastomer materials to serve as a resilient cushion for the diamond cutting wires.

\* \* \* \* \*